United States Patent Office 3,041,354
Patented June 26, 1962

3,041,354
ACYL DERIVATIVES OF A POLYHYDROXY
BICYCLIC ETHER
John F. Olin, Dayton, Ohio, assignor to Monsanto Chemical Company, St. Louis, Mo., a corporation of Delaware
No Drawing. Filed Nov. 20, 1959, Ser. No. 854,259
19 Claims. (Cl. 260—345.2)

This invention relates to acylation of a polyhydroxy bicyclic ether. More particularly, this invention relates to the di- and tri-acyl derivatives of 9-hydroxy-3-oxabicyclo[3.3.1]-nonane-1,5-dimethanol as new compounds. Furthermore, this invention relates to methods for producing said acyl derivatives of 9-hydroxy-3-oxabicyclo[3.3.1]nonane-1,5-dimethanol from 2,2,6,6-tetramethylolcyclohexanol.

The preparation of the cyclic polyhydroxy alcohol, 2,2,6,6-tetramethylolcyclohexanol, was first disclosed by Mannich and Brose, Ber. Deutsche, 6, 833 (1923), and can be represented by the formula

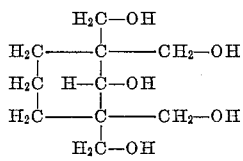

This alcohol can be dehydrated to split out water and form a polyhydroxy bicyclic ether, e.g., 9-hydroxy-3-oxabicyclo[3.3.1]-nonane-1,5-dimethanol, illustrated by the formula

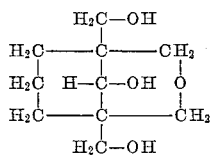

and disclosed and claimed in my copending application Serial No. 854,264, filed November 20, 1959. Heretofore, it has not been known that the cyclic polyhydroxy alcohol could be acylated to form the di- and tri-acyl derivatives of the polyhydroxy bicyclic ether directly without first forming the polyhydroxy bicyclic ether.

An object of this invention is to provide a process for directly forming the di- and tri-acyl derivatives of 9-hydroxy-3-oxabicyclo[3.3.1]nonane - 1,5 - dimethanol from 2,2,6,6-tetramethylolcyclohexanol.

Another object of this invention is to provide a process for simultaneously etherifying and acylating 2,2,6,6-tetramethylolcyclohexanol to form di- and tri-acyl derivatives of 9-hydroxy-3-oxabicyclo[3.3.1]nonane-1,5-dimethanol.

Another object of this invention is to provide 1,5-bis-(acyloxymethyl)-9 - acyloxy-3-oxabicyclo[3.3.1]nonanes as new compounds.

Another object of this invention is to provide 1,5-bis-(acyloxymethyl)-9 - hydroxy-3-oxabicyclo[3.3.1]nonanes as new compounds.

Other objects and advantages of this invention will be apparent to one skilled in the art upon studying this disclosure.

In accordance with this invention, 2,2,6,6-tetramethylolcyclohexanol is acylated azeotropically with a monocarboxylic acid in the presence of an acid condensation catalyst to form di- and tri-acyl derivatives of 9-hydroxy-3-oxabicyclo[3.3.1]nonane-1,5-dimethanol. The monocarboxylic acid is selected from the group consisting of primary alkyl, secondary alkyl, tertiary alkyl, aryl and alkaryl acids. The use of primary alkyl acids gives as product a tri-acyl derivative; e.g., 1,5-bis(acyloxymethyl)-9-acyloxy-3-oxabicyclo[3.3.1]nonane, which can be illustrated by the formula

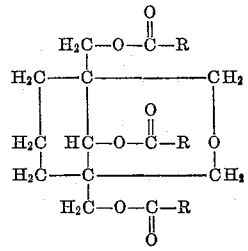

wherein R is selected from the group consisting of hydrogen and primary alkyl. The use of secondary alkyl, tertiary alkyl, aryl and alkaryl acids give as product a di-acyl derivative; e. g., 1,5-bis(acyloxymethyl)-9-hydroxy-3-oxabicyclo[3.3.1]nonane, which can be illustrated by the formula

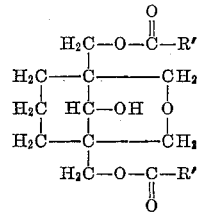

wherein R' is selected from the group consisting of secondary alkyl, tertiary alkyl, aryl and alkaryl. In conducting the process of this invention, an azeotrope is formed between the water produced in the reaction and an added azeotrope former and the resulting azeotrope distilled from the reaction zone in such a manner that the water is removed from the reaction zone with the azeotrope former being returned thereto. The product is separated from the azeotrope former by fractional distillation, flash distillation, evaporation or the like.

Further, in accordance with the present invention, there are provided, as new compounds, acyl derivatives of 9 - hydroxy-3-oxabicyclo[3.3.1]nonane-1,5-dimethanol selected from the group consisting of compounds of the formula

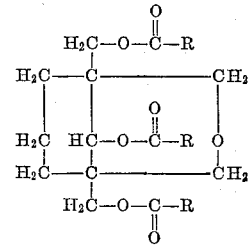

wherein R is selected from the group consisting of hydrogen and primary alkyl of not more than 11 carbon atoms, and compounds of the formula

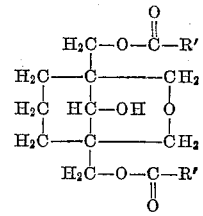

wherein R' contains not more than 11 carbon atoms and is selected from the group consisting of secondary alkyl, tertiary alkyl, hydrocarbon aryl and hydrocarbon alkaryl.

The 2,2,6,6-tetramethylolcyclohexanol reactant can be prepared by any of the methods known to those skilled in the art. For example, this reactant can be prepared by the method of Mannich and Brose wherein cyclohexanol and formaldehyde are condensed in the presence of an alkaline catalyst, such as calcium oxide or calcium hydroxide. Other methods are also known to those skilled in the art for the preparation of this reactant.

The acid reactant can be any monocarboxylic acid and preferably is a monocarboxylic acid wherein the acid residue comprises either a primary alkyl, secondary alkyl, tertiary alkyl, aryl, or alkaryl radical. The iso-alkyl radicals are also included within the term primary alkyl radicals. The secondary alkyl and tertiary alkyl radicals can also be defined as those radicals wherein the α-carbon atom of the acid is substituted with either one or two alkyl radicals, thereby forming the secondary or tertiary structure. The acid reactant employed in the process of this invention preferably contains less than 12 carbon atoms per molecule; however, monocarboxylic acids containing more than 12 carbon atoms can also be used and the use of acids containing less than 12 carbon atoms are included only in a preferred form of the invention. Thus, acid reactants containing more than 12 carbon atoms are operative in the invention since the reaction is dependent upon the structural relationship and not upon the number of carbon atoms in the acid molecule. The monocarboxylic acid preferably is selected from the group consisting of those of the formula

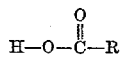

wherein R is selected from the group consisting of hydrogen and primary alkyl of not more than 11 carbon atoms and those of the formula

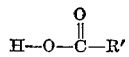

wherein R' contains not more than 11 carbon atoms and is selected from the group consisting of secondary alkyl, tertiary alkyl, hydrocarbon aryl and hydrocarbon alkaryl.

By way of example, but not limitation, the following monocarboxylic acids can be used as reactants in the process of this invention: formic acid, acetic acid, propionic acid, butyric acid, valeric acid, hexanoic acid, nonanoic acid, undecanoic acid, 2-methylpropionic acid, 2-methylbutyric acid, 2-ethylbutyric acid, 2-methylhexanoic acid, 2-ethylhexanoic acid, 2-propylhexanoic acid, 2-methylundecanoic acid, trimethylacetic acid, 2,2-diethylbutyric acid, 2,2-dimethylhexanoic acid, 2-methyl-2-butylhexanoic acid, 2,2-dimethylnonanoic acid, benzoic acid, 2-methylbenzoic acid, 3-methylbenzoic acid, and 4-methylbenzoic acid.

The product of the reaction of this invention is either a di- or a tri-acyl derivative of 9-hydroxy-3-oxabicyclo-[3.3.1]nonane-1,5-dimethanol and the particular product obtained depends upon the nature of the acid reactant employed. Thus, the primary alkyl acids react with a 2,2,6,6-tetramethylolcyclohexanol to form the tri-acylated product; i.e., 1,5 - bis(acyloxymethyl)-9-acyloxy-3-oxabicyclo[3.3.1]nonane. In contrast, the secondary alkyl, tertiary alkyl, aryl, and alkaryl acids result in the formation of the di-acylated product; i.e., 1,5-bis(acyloxymethyl)-9-hydroxy-3-oxabicyclo[3.3.1]nonane.

Illustrative examples of some of the tri-acyl products of this invention include the following:

1,5 - bis(acetyloxymethyl) - 9 - acetyloxy - 3 - oxabicyclo-[3.3.1]nonane
1,5 - bis(propionoyloxymethyl) - 9 - propionoyloxy - 3-oxabicyclo[3.3.1]nonane
1,5 - bis(butyroyloxymethyl) - 9 - butyroyloxy - 3 -oxabicyclo[3.3.1]nonane
1,5 - bis(hexanoyloxymethyl) - 9 - hexanoyloxy - 3 - oxabicyclo[3.3.1]nonane
1,5 - bis(nonanoyloxymethyl) - 9 - nonanoyloxy - 3 - oxabicyclo[3.3.1]nonane Illustrative examples of some of the di-acylated products of this invention include the following:

1,5 - bis(2 - ethylbutyroyloxymethyl) - 9 - hydroxy - 3-oxabicyclo[3.3.1]nonane
1,5 - bis(2 - methylpropionoyloxymethyl) - 9-hydroxy-3-oxabicyclo[3.3.1]nonane
1,5 - bis(2 - ethylhexanoyloxymethyl) - 9 - hydroxy - 3-oxabicyclo[3.3.1]nonane
1,5 - bis(2 - propylhexanoyloxymethyl) - 9 - hydroxy - 3-oxabicyclo[3.3.1]nonane
1,5 - bis(trimethylacetyloxymethyl) - 9 - hydroxy - 3-oxabicyclo[3.3.1]nonane
1,5 - bis(2,2 - diethylbutyroyloxymethyl) - 9 - hydroxy-3-oxabicyclo[3.3.1]nonane
1,5 - bis(2,2 - dimethylnonanoyloxymethyl)-9-hydroxy-3-oxabicyclo[3.3.1]nonane
1,5 - bis(benzoyloxymethyl) - 9 - hydroxy - 3 - oxabicyclo[3.3.1]nonane
1,5 - bis(2 - methylbenzoyloxymethyl) - 9 - hydroxy - 3-oxabicyclo[3.3.1]nonane
1,5 - bis(3 - methylbenzoyloxymethyl) - 9 - hydroxy - 3-oxabicyclo[3.3.1]nonane In a preferred embodiment of this invention, the reaction is carried out azeotropically in the presence of an azeotrope former or hydrocarbon entrainer to facilitate the removal of the water formed as a product in the reaction. In general, the azeotrope former can be any organic compound which forms an azeotrope with water, said azeotrope having a boiling point in the range of from 75° C. to 100° C., and which has a boiling point sufficiently separated from the acylated product to permit separation of the acylated product and solvent by distillation or other means of separation. Preferably, the azeotrope former is an aromatic hydrocarbon which may also be an alkylated aromatic hydrocarbon provided there are not more than 4 carbon atoms in all the alkyl substituents. Examples of suitable azeotrope formers include: toluene; o-, m-, and p-xylene; ethylbenzene; n-propylbenzene; cumene; 1,2,3-trimethylbenzene; 1,2,3,4-tetramethylbenzene; 1,2,4,5 - tetramethylbenzene; and butylbenzene. In addition, paraffinic hydrocarbons, particularly those containing from 6 to 9 carbon atoms per molecule, can also be employed as azeotrope formers in conducting the reaction of this invention. Further, chlorinated derivatives of these aromatic and paraffinic azeotrope formers can also be employed if desired.

Preferably, the reaction of this invention is carried out in the presence of an acidic catalyst, such as sulfuric acid, alkanesulfonic acid or arylsulfonic acid. The sulfuric acid can be of any concentration since the water present in a low concentration acid is merely azeotropically distilled from the reaction zone. It is preferred to use an acid containing at least 50% sulfuric acid. The alkanesulfonic acid catalysts preferably contain from 1 to 4 carbon atoms per molecule. Examples of such alkanesulfonic acids include methanesulfonic acid, ethanesulfonic acid, propanesulfonic acid, and butanesulfonic acid. If desired, a mixture of lower alkanesulfonic acids can be used as a catalyst and such a mixture containing methane, ethane and propanesulfonic acids is commercially available. Ordinarily, the alkanesulfonic acid will comprise from 92 to 95% sulfonic acid, from 1 to 2% sulfuric acid, and from 3 to 6% water. Suitable arylsulfonic acid catalyst which can be used in the process of this invention include the benzenesulfonic acids, toluenesulfonic acids and chlorobenzenesulfonic acids, with p-toluenesulfonic acid and 4-chlorobenzenesulfonic acid being preferred.

The reaction of this invention is carried out at a temperature corresponding to the azeotropic distillation temperature of the water former and the water produced in the dehydration step. To some extent, the desired temperature can be obtained by regulating the amount of azeotrope former present in the reaction zone. Ordinarily, the reaction temperature is maintained within the range of from 85° C. to 125° C. The use of temperatures below 75° C. is not desired since the period required for completion of the reaction is extraordinarily long. Although higher temperatures favor the reaction, temperatures above 175° C. promote cleavage of the ether ring, particularly in the presence of the acid catalyst, and, therefore, are not used. Thus, the use of temperatures above approximately 175° C. will result in the formation of esters of 2,2,6,6-tetramethylolcyclohexanol instead of the formation of the di- and tri-acyl derivatives of 9 - hydroxy - 3 - oxabicyclo[3.3.1]nonane-1,5-dimethanol.

Ordinarily, stoichiometric amounts of 2,2,6,6-tetramethylolcyclohexanol and acid reactant are maintained in the reaction zone. The acid can be present in slight excess or, if desired, in an amount as large as 10 times the amount of 2,2,6,6-tetramethylolcyclohexanol present. The use of an excess of 2,2,6,6-tetramethylolcyclohexanol is to be avoided since the presence of an excess of this reactant ordinarily results in the formation of undesirable side products.

The amount of catalyst present in the reaction zone can be varied over wide limits as determined by the temperature to be used and the reaction time desired. At higher temperatures, the amount of catalyst required in the reaction zone is smaller than when lower temperatures are used. Ordinarily, the amount of catalyst used will be between 1 and 8% by weight of the amount of 2,2,6,6-tetramethylolcyclohexanol.

The amount of azeotrope former present in the reaction zone can also be varied over wide limits; however, the amunt of azeotrope former is selected to give the desired temperature in the reaction zone. Ordinarily, the amount of azeotrope former present will be within the range of from 25 to 200% by weight of the amount of 2,2,6,6-tetramethylolcyclohexanol present in the reaction zone.

In conducting the reaction of this invention in an azeotropic manner, the water split out in the reaction is continuously removed from the reaction system. Upon completion of the reaction, as determined by measurement of the amount of water evolved, the reaction effluent is neutralized with a weakly alkaline solution to remove the acid catalyst and some of the side products which may have been formed in the reaction. Suitable alkaline solutions which can be used include aqueous solutions of sodium carbonate, potassium carbonate, sodium hydroxide, and potassium hydroxide. Further treatment of the neutralized reaction mixture for recovery of the product depends upon the physical properties of the product. For example, where the product is a liquid and has a boiling point sufficiently separated from the boiling point of the azeotrope former, the product can be recovered by distillation. Where the azeotrope former and the product have closely related boiling points, the product can be recovered by extraction. In some cases, the product or the reaction mixture is a solid material which can be recovered by extraction with a solvent from which the product can be crystallized by cooling.

The 1,5 - bis(acyloxymethyl)-9-acyloxy-3-oxabicyclo-[3.3.1]nonane products of this invention are ordinarily low melting point crystalline solids which are light in color. However, some of these tri-acylated products are rather viscous liquid materials which vary in color from water-white to straw color. The 1,5-bis(acyloxymethyl)-9-hydroxy-3-oxabicyclo[3.3.1]nonane products are usually crystalline solids which are substantially pure white in color and which have a melting point somewhat higher than the tri-acylated products. Both the di- and tri-acylated products are insoluble in water and relatively soluble in paraffinic and aromatic hydrocarbons.

The di- and tri-acylated products of this invention possess utility for a wide variety of purposes since the compounds contain several functional groups. For example, these compounds find use as plasticizers in various resins such as nitrocellulose, polyvinyl acetate, and polyethyl acrylate. They are also useful as chemical intermediates for the formation of other useful compounds; for example, phthalic anhydride and methylterphthalate can be reacted with the di- and tri-acylated products to form polyester resins.

The advantages, desirability and usefulness of the present invention are well illustrated by the following examples.

*Example 1*

1,5 - bis(acetyloxymethyl) - 9 - acetyloxy - 3 - oxabicyclo[3.3.1]nonane was prepared from 220 g. (1 mole) of 2,2,6,6-tetramethylolcyclohexanol and 328 g. (5.46 moles) of acetic acid. These reactants, together with 130 g. of methylisobutylketone and 4 ml. of methanesulfonic acid, were heated under reflux for a period of 1 hour. Since no layering had occurred in the water trap, 100 ml. of toluene was added with the formation of two layers. The reaction mixture was again heated for a period of 3 hours at a temperature of 103° C. At this time, an additional 100 g. of acetic acid was added and the reaction mixture heated for an additional 15 hours with the water evolved being collected in a water trap. The reaction product was then washed once with water, once with a 5% sodium acetate solution and once more with water. The reaction mixture was then distilled at a pressure of 0.1 mm. and a fraction boiling in the range of 160–175° C. was recovered and redistilled to obtain a fraction amounting to 253 g. and boiling at 155–160° C./0.05 mm. Upon standing, a crystalline precipitate formed in the recovered fraction. Hexane containing a small amount of acetone was added to the recovered fraction and the mixture cooled to permit the formation of the colorless, sandy crystals of 1,5-bis(acetyloxymethyl)-9-acetyloxy-3-oxabicyclo[3.3.1]nonane. This product had a melting point of 70.5–71° C. The molecular weight of the product was found to be 325 as compared with a calculated value of 328 and the saponification equivalent was found to be 108.5 as compared with a calculated value of 109.4. The compound was found to have a carbon content of 58.6% and a hydrogen content of 7.37% as compared with calculated values of 58.2% and 7.41%, respectively. An examination of the infrared spectrum indicated the presence of an ether linkage and the absence of the hydroxy grouping.

As further proof of the structure of the compound obtained in the example, 9-hydroxy-3-oxabicyclo[3.3.1]-nonane-1,5-dimethanol was acylated with an excess of acetic anhydride using methanesulfonic acid as the catalyst. The product obtained had a melting point of 71–72° C. and a saponification equivalent of 108.3 as compared with a calculated value of 108.9. The melting point of a mixture of this material with the product obtained from 2,2,6,6-tetramethylolcyclohexanol was also found to be 71–72° C.

*Example 2*

In this example, 1,5-bis(propionoyloxymethyl)-9-propionoyloxy-3-oxabicyclo[3.3.1]nonane was prepared from 220 g. (1 mole) of 2,2,6,6-tetramethylolcyclohexanol and 259 g. (3.5 moles) propionic acid. These reactants, together with 100 g. of benzene and 4 ml. of methanesulfonic acid, were refluxed under a water trap for 24 hours. At the end of this time, the reaction mixture was washed with water and then with a 5% potassium carbonate solution. The mixture was then distilled at 0.05 mm. to obtain a fraction boiling at 172–177° C. Upon sitting, this fraction solidified and was taken up in hexane from which the 1,5 - bis(propionoloxymethyl) - 9 - propionoloxy - 3-oxabicyclo[3.3.1]nonane was crystallized. The product weighed 284 g. and had a melting point of 50–51° C. The molecular weight of the product was found to be 348 as compared with a calculated value of 370 and had a saponification equivalent of 123 as compared with a calculated value of 123.3. An inspection of the infrared spectrum disclosed the presence of the ether linkage and the absence of the hydroxyl group.

*Example 3*

1,5 - bis(nonanoyloxymethyl) - 9 - nonanoyloxy - 3-oxabicyclo[3.3.1]nonane was prepared from a 2.5 g. (0.375 mole) of 2,2,6,6-tetramethylolcyclohexanol and 207 g. (1.31 moles) of nonanoic acid. These reactants, together with 1 ml. of methanesulfonic acid, 5 g. of activated carbon, 3 g. of filter aid, and 100 g. of benzene, were refluxed 16 hours under a water trap at a temperature of 95–105° C. After 27 ml. of water was collected in the water trap, the reaction mixture was filtered warm and washed with an alkaline solution containing 15 g. of potassium carbonate in 150 ml. of water, followed by washing with 150 g. of water. The recovered material was then distilled at a temperature of 109° C. and a pressure of 0.2 mm. to remove volatile material. The residue remaining in the distillation flask was filtered to remove a small amount of precipitate which had formed. The filtered residue, comprising 234 g., is the product 1,5-bis-(nonanoyloxymethyl) - 9 - nonanoyloxy - 3 - oxabicyclo-[3.3.1]nonane which is a light straw colored oil. The saponification equivalent of this product was found to be 196.3 as compared with the calculated value of 207.3.

*Example 4*

In this example, 102 g. (1 mole) of trimethylacetic acid, 73 g. (0.33 mole) of 2,2,6,6-tetramethylolcyclohexanol, 75 g. of benzene, and 1.3 ml. of methanesulfonic acid were heated together under reflux for 16 hours. At the end of this time, 18 ml. of water had been collected in the water trap and the reaction mixture was permitted to cool. Upon cooling, the reaction products solidified. The reaction mixture did not dissolve in 100 ml. of boiling heptane. After pouring off the heptane, the product was leached out with hot benzene and the recovered benzene solution was allowed to cool with the formation of a precipitate. The precipitate was filtered and washed with benzene, followed by washing with 50% methanol and finally by washing with water, to recover 65 g. of 1,5-bis-(trimethylacetyloxymethyl) - 9 - hydroxy - 3 - oxabicyclo-[3.3.1]nonane as product. The product analyzed 65.69% carbon and 9.97% hydrogen as compared with calculated values of 64.9% carbon and 9.26% hydrogen. The melting point of the product was 185–186° C. and the saponification equivalent was 182.6 as compared with a calculated value of 185.9.

*Example 5*

In this example, 1,5-bis(2-ethylbutyroyloxymethyl)-9-hydroxy-3-oxabicyclo[3.3.1]nonane was prepared from 406 g. (3.5 moles) of 2-ethylbutyric acid and 220 g. (1 mole) of 2,2,6,6-tetramethylolcyclohexanol using 100 g. of benzene as an azeotrope former and 4 ml. of methanesulfonic acid as catalyst. These materials were mixed together and heated under reflux for a period of time of 22 hours to recover 58 moles of water in the water trap. At the end of this time, the reaction mixture was washed with water followed by washing with 5% potassium carbonate solution. The washed mixture was washed a second time and then distilled to remove water and benzene. Upon standing overnight, the residue remaining in the distillation flask solidified. The solidified material was then contacted with 300 ml. of heptane to dissolve out the product. The solution was separated from the undissolved solid material by filtration and placed in an ice box to cool. Upon cooling, a precipitate was formed which was separated by filtration and washed with hexane. The product, 1,5-bis(2-ethylbutyroyloxymethyl)-9-hydroxy-3-oxabicyclo[3.3.1]nonane, weighed 35 g. and had a melting point of 82.5–83° C. The product analyzed 66.06% carbon and 9.63% hydrogen as compared with calculated values of 66.39% carbon and 9.62% hydrogen. The saponification equivalent of the product was found to be 196.3 as compared wtih a calculated value of 199.0.

*Example 6*

In this example, 55 g. of 2,2,6,6-tetramethylolcyclohexanol, 190 g. of 2-ethylhexanoic acid, 3 g. of activated carbon, 1 g. of Super Cel, 1 ml. of methanesulfonic acid, and 100 ml. of benzene were heated together under a water trap for a period of 26 hours at a temperature of 100–105° C. At the end of this time, 14 g. of water had been collected in the water trap. The reaction mixture was then filtered and washed with a 20% sodium acetate solution, followed by washing with water. The recovered washed mixture was distilled under a pressure of 0.1 mm. to obtain 95 g. of 1,5-bis(2-ethylhexanoyloxymethyl)-9-hydroxy-3-oxabicyclo[3.3.1]nonane boiling at 230–245° C. This product had a molecular weight of 380 as compared with the calculated value of 454 and a saponification equivalent of 201.

*Example 7*

In this example, 1,5-bis(benzoyloxymethyl)-9-hydroxy-3-oxabicyclo[3.3.1]nonane was prepared from 213.5 g. (1.75 moles) of benzoic acid and 110 g. (0.5 mole) of 2,2,6,6-tetramethylolcyclo-hexanol. These reactants, together with 100 g. of benzene and 2 g. of methanesulfonic acid, were heated under a water trap for a period of 16 hours. At this time, 27 ml. of water had been recovered in the water trap. The reaction mixture, upon cooling, was solid. The product was washed with dilute potassium carbonate and most of the benzene removed by evaporation. The product was then dissolved in hexane and chilled in an ice bath to effect crystallization. The precipitate formed was recovered by filtration, washed with cold hexane, and dried in the air. This material was recrystallized from a mixture of diethyl ether and pentane to recover the 1,5-bis(benzoyloxymethyl)-9-hydroxy-3-oxabicyclo[3.3.1]nonane melting at 155–155.5° C. The analysis of this product showed 70.06% carbon and 6.73% hydrogen as compared with calculated values of 70.3% carbon and 6.39% hydrogen. The product had a saponification equivalent of 205.8 as compared with a calculated value of 205.0.

Reasonable variation and modification of the invention as described are possible, the essence of which is that there have been provided (1) a process for azeotropicallyacylating 2,2,6,6-tetramethylolcyclohexanol with a monocarboxylic acid to obtain di- and tri-acyl derivatives of 9-hydroxy-3-oxabicyclo[3.3.1]nonane-1,5 - dimethanol and (2) 1,5 - bis(acyloxymethyl) - 9 - acyloxy - 3 - oxabicyclo [3.3.1]nonane and 1,5-bis(acyloxymethyl)-9-hydroxy-3-oxabicyclo[3.3.1]nonane as new compounds.

I claim:
1. A compound selected from the group consisting of compounds of the formula

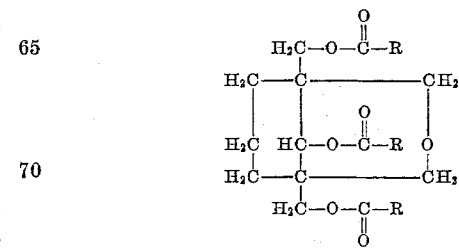

wherein R is selected from the group consisting of hydrogen and primary alkyl of not more than 11 carbon atoms, and compounds of the formula

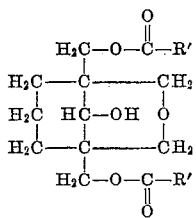

wherein R' contains not more than 11 carbon atoms and is selected from the group consisting of secondary alkyl, tertiary alkyl, hydrocarbon aryl and hydrocarbon alkaryl.

2. The compound, 1,5-bis(acetyloxymethyl)-9-acetyloxy-3-oxabicyclo[3.3.1]nonane.

3. The compound, 1,5-bis(propionoyloxymethyl)-9-propionoyloxy-3-oxabicyclo[3.3.1]nonane.

4. The compound, 1,5-bis(nonanoyloxymethyl)-9-nonanoyloxy-3-oxabicyclo[3.3.1]nonane.

5. The compound, 1,5-bis(2-ethylbutyroyloxymethyl)-9-hydroxy-3-oxabicyclo[3.3.1]nonane.

6. The compound, 1,5-bis(2-ethylhexanoyloxymethyl)-9-hydroxy-3-oxabicyclo[3.3.1]nonane.

7. The compound, 1,5-bis(trimethylacetyloxymethyl)-9-hydroxy-3-oxabicyclo[3.3.1]nonane.

8. The compound, 1,5-bis(benzoyloxymethyl)-9-hydroxy-3-oxabicyclo[3.3.1]nonane.

9. A process comprising heating 2,2,6,6-tetramethylolcyclohexanol and a monocarboxylic acid selected from the group consisting of those of the formula

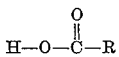

wherein R is selected from the group consisting of hydrogen and primary alkyl of not more than 11 carbon atoms and those of the formula

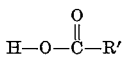

wherein R' contains not more than 11 carbon atoms and is selected from the group consisting of secondary alkyl, tertiary alkyl, hydrocarbon aryl and hydrocarbon alkaryl in the presence of an azeotrope former and an acid condensation catalyst at a temperature of azeotropic distillation and recovering as product of the process a compound selected from the group consisting of compounds of the formula

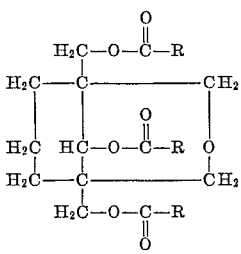

wherein R is selected from the group consisting of hydrogen and primary alkyl of not more than 11 carbon atoms, and compounds of the formula

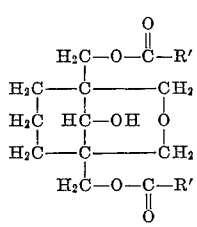

wherein R' contains not more than 11 carbon atoms and is selected from the group consisting of secondary alkyl, tertiary alkyl, hydrocarbon aryl and hydrocarbon alkaryl.

10. A process comprising heating 2,2,6,6-tetramethylolcyclohexanol and a monocarboxylic acid of the formula

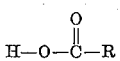

wherein R is selected from the group consisting of hydrogen and primary alkyl of not more than 11 carbon atoms in the presence of an azeotrope former and an acid condensation catalyst at a temperature of azeotropic distillation and recovering as product of the process a compound of the formula

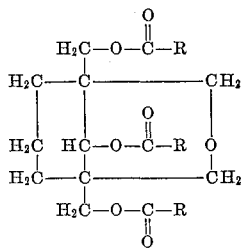

wherein R is selected from the group consisting of hydrogen and primary alkyl of not more than 11 carbon atoms.

11. A process comprising heating 2,2,6,6-tetramethylolcyclohexanol and a monocarboxylic acid of the formula

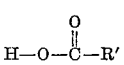

wherein R' contains not more than 11 carbon atoms and is selected from the group consisting of secondary alkyl, tertiary alkyl, hydrocarbon aryl and hydrocarbon alkaryl in the presence of an azeotrope former and an acid condensation catalyst at a temperature of azeotropic distillation and recovering as product of the process a compound of the formula

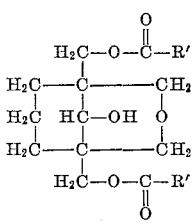

wherein R' contains not more than 11 carbon atoms and is selected from the group consisting of secondary alkyl, tertiary hydrocarbon alkyl, aryl and hydrocarbon alkaryl.

12. A process of claim 9 wherein said temperature is within the range of 75–175° C.

13. A process comprising heating 2,2,6,6-tetramethylolcyclohexanol and acetic acid under azeotropic distillation conditions at a temperature in the range of 75–175° C. in the presence of an acid condensation catalyst and recovering 1,5-bis(acetyloxymethyl)-9-acetyloxy-3-oxabicyclo[3.3.1]nonane as product of the process.

14. A process comprising heating 2,2,6,6-tetramethylolcyclohexanol and propionic acid under azeotropic distillation conditions at a temperature in the range of 75–175° C. in the presence of an acid condensation catalyst and recovering 1,5-bis(propionoyloxymethyl)-9-propionoyloxy-3-oxabicyclo[3.3.1]nonane as product of the process.

15. A process comprising heating 2,2,6,6-tetramethylolcyclohexanol and nonanoic acid under azeotropic distillation conditions at a temperature in the range of 75–175° C. in the presence of an acid condensation catalyst and recovering 1,5-bis(nonanoyloxymethyl)-9-nonanoyloxy-3-oxabicyclo[3.3.1]nonane as product of the process.

16. A process comprising heating 2,2,6,6-tetramethylolcyclohexanol and trimethylacetic acid under azeotropic distillation conditions at a temperature in the range of 75–175° C. in the presence of an acid condensation catalyst and recovering 1,5-bis(trimethylacetyloxymethyl)-9- hydroxy-3-oxabicyclo[3.3.1]nonane as product of the process.

17. A process comprising heating 2,2,6,6-tetramethylolcyclohexanol and 2-ethylbutyric acid under azeotropic distillation conditions at a temperature in the range of 75–175° C. in the presence of an acid condensation catalyst and recovering 1,5-bis(2-ethylbutyroyloxymethyl)-9-hydroxy-3-oxabicyclo[3.3.1]nonane as product of the process.

18. A process comprising heating 2,2,6,6-tetramethylolcyclohexanol and 2-ethylhexanoic acid under azeotropic distillation conditions at a temperature in the range of 75–175° C. in the presence of an acid condensation catalyst and recovering 1,5-bis(2-ethylhexanoyloxymethyl)-9-hydroxy-3-oxabicyclo[3.3.1]nonane as product of the process.

19. A process comprising heating 2,2,6,6-tetramethylolcyclohexanol and benzoic acid under azeotropic distillation conditions at a temperature in the range of 75–175° C. in the presence of an acid condensation catalyst and recovering 1,5-bis(benzoyloxymethyl)-9-hydroxy-3-oxabicyclo[3.3.1]nonane as product of the process.

No references cited.